United States Patent [19]

Brown et al.

[11] 4,170,695

[45] Oct. 9, 1979

[54] SELECTIVE PLUGGING OF BROKEN FIBERS IN TUBESHEET-HOLLOW FIBER ASSEMBLIES

[75] Inventors: William E. Brown, Walnut Creek; Floris Y. Tsang, Concord, both of Calif.

[73] Assignee: The Dow Chemical Company, Midland, Mich.

[21] Appl. No.: 835,567

[22] Filed: Sep. 22, 1977

[51] Int. Cl.$^2$ ............................................. H01M 6/20
[52] U.S. Cl. .................................. 429/193; 429/104; 264/36
[58] Field of Search .................. 264/36; 429/104, 193

[56] References Cited

U.S. PATENT DOCUMENTS

| | | | |
|---|---|---|---|
| 3,499,062 | 3/1970 | Hoffmann | 264/36 |
| 3,679,480 | 7/1972 | Brown | 429/104 |
| 3,968,192 | 7/1976 | Geary | 264/36 |

*Primary Examiner*—Thomas P. Pavelko
*Attorney, Agent, or Firm*—Robert R. Stringham

[57] ABSTRACT

There is disclosed a method of selectively plugging broken fibers included in a bundle of hollow fibers having open ends protruding from a tubesheet and closed ends distal from the tubesheet. The protruding open ends are immersed in a curable, fluid sealant and capillary attraction is utilized to draw the sealant into the broken fibers. The resistance to compression of the gases in the unbroken fibers is such that the sealant does not move into the latter fibers so far that they will not be open after the protruding ends are removed. The imbibed sealant is cured in place and the protruding fiber ends are cut off flush with the final surface of the tubesheet. This method is of particular value in preparing tubesheet-fiber assemblies for use in high temperature alkali metal-sulfur battery cells, wherein the hollow fibers function as an electrolyte-separator.

13 Claims, No Drawings

SELECTIVE PLUGGING OF BROKEN FIBERS IN TUBESHEET-HOLLOW FIBER ASSEMBLIES

BACKGROUND OF THE INVENTION

A variety of permeability separatory devices in which the membrane takes the form of a large number of fine hollow fibers is known. In another type of application, hollow fibers composed of materials capable of transporting alkali metal cations and resistant to the molten metal, and to molten alkali metal polysulfides, have found use as electrolyte-separators in high temperature alkali metal-sulfur battery cells (see U.S. Pat. Nos. 3,476,602; 3,765,944 and 3,791,868, for example).

Common to both permeability separatory devices and battery cells of the foregoing types is the use of at least one "tubesheet" or relatively thin wall member which is sealingly engaged with the fiber exteriors and functions to separate different bodies of fluid in contact with the interior and exterior surfaces of the fibers (and to fix the position of the fibers within the device or cell).

Hollow fibers, i.e., thin-walled, hairlike tubules, are relatively fragile, particularly when composed of materials, such as glasses or ceramics, which are suitable for use in high temperature batteries. Consequently, it is quite difficult to avoid breaking at least several fibers when fabricating tubesheet-fiber assemblies. Even though only a few fibers out of a million may be broken, the resulting assembly will generally be useless for its intended purpose. This is particularly so in applications such as blood dialysis or high temperature batteries.

Several methods are known for salvaging tubesheethollow fiber assemblies made from resinous materials, but such methods are either inoperable or impractical when the assembly is composed of materials suitable for use in batteries operating at temperatures of 300° C. or more and containing molten alkali metals and corresponding polysulfides (or halides).

Exemplary of known salvage methods are those disclosed in U.S. Pat. Nos. 3,499,062 and 3,968,192.

The 3,499,062 patent discloses (at columns 23 and 24) a method of repairing leaks in a fluid separation apparatus comprising a plurality of open-ended, generally parallel hollow fibers, potted at each end in "wall members" or tubesheets; and a tubular casing sealed to the peripheral surfaces of the tubesheets. Openings in the outer surface of a given tubesheet which connect to a leak through the tubesheet itself or to a leaking fiber are closed by forming a pool of a curable resinous liquid on the tubesheet surface, drawing enough of it into the leak-connected opening to close off the leak or leaking fiber, removing the excess liquid and solidifying the remainder in place. (If the leak is in a fiber, the terminous of the fiber lumen in each of the two tubesheets must be so closed.)

In this method, flow of the resinous liquid into fibers which are not leaking is prevented by maintaining the liquid under a pressure which is greater than that exterior to the fibers but less than the pressure applied to the fiber lumens at their uncovered ends.

The 3,968,192 patent discloses an alternate method of salvaging leaky tubesheet-hollow fiber assemblies of the above-described type. The fiber and tubesheet materials are either thermoplastic or are heat-degradeable to same, and the leak-connected openings are first located and then closed by localized, temporary application of heat and mechanical pressure to the materials in their immediate vicinity.

Neither of the foregoing methods is applicable to tubesheet-fiber assemblies which must function in corrosive, high temperature environments. In order to effectively plug any broken fibers in such assemblies, the plugging material, or "sealant", must meet several requirements which cannot be met by resinous materials. That is, the sealant not only must be fluid enough to be forced into the broken fibers under practicable operating conditions but also must be convertible, in situ and at temperatures below the distortion temperatures of the assembly materials, to a rigid, non-porous solid which is bonded to the fiber walls, has a coefficient of expansion which adequately matches that of the fiber material and which will endure in the environment and at the temperatures it is exposed to during operation of the device.

Also, the technique used to prevent sealing off of good fibers in the process of the 3,499,062 patent cannot be used with fibers having closed ends. Although entry of the sealant into good fibers will be resisted by compression of the air in those fibers, enough sealant can still enter to effectively plug them.

OBJECTS OF THE INVENTION

There is a need for a sealant which meets the requirements for high temperature battery cells and it is an object of the present invention to provide such a sealant.

A broader object is to provide a method of sealing broken (or leaking) fibers in tubesheet-hollow fiber assemblies comprising a plurality of unbroken fibers having closed ends distal from the tubesheet and open ends protruding from and adjacent to the tubesheet.

A particular object is to provide such a method which can be applied to tubesheet-hollow fiber assemblies which, except for including broken or leaking fibers, is otherwise suitable to be processed for use as an electrolyte-separator in a high temperature battery.

An additional object is to provide a method which may be employed to remedy leaks in tubesheet-hollow fiber assemblies in which the hollow fibers and tubesheet are composed of glasses or ceramics.

A further object is to provide a method of salvaging tubesheet-hollow fiber assemblies which include a sufficient number of broken or leaking fibers to be inoperable for their intended purpose.

Yet another object is to provide a salvage method which utilizes, to advantage, those portions of the open ends of the fibers protruding from the tubesheet at an intermediate stage in what is regarded as the most practical method of fabricating tubesheet-hollow fiber assemblies for use as electrolyte-separators in high temperature batteries.

Still other objects will be made apparent to those skilled in the art by the following teachings, examples and claims.

SUMMARY OF THE INVENTION

The present invention, broadly, is a method of selectively plugging broken or imperfect fibers which, together with unbroken fibers, constitute a bundle of hollow fibers potted in a tubesheet body, the majority of said fibers being unbroken, i.e., having closed ends distal from the tubesheet and open ends adjacent to and protruding from the tubesheet. The protruding ends of all the fibers are immersed to an appropriate depth, in a liquid sealant, such that the sealant will be drawn by capillary attraction into the broken or imperfect fibers at least to a point beyond the nearest tubesheet surface. The gas pressure in the closed fiber ends is such that the sealant will not be drawn into the good fibers so far that they too will remain plugged after the open fiber ends have been cut off flush with the final tubesheet surface (which may be the original face or a new face established by grinding off part of the tubesheet).

More precisely, the invention may be defined as the method of treating a tubesheet/hollow fiber assembly to ensure that any defective fibers included therein will be selectively plugged, said method comprising A. providing as said assembly one which comprises a bundle of hollow fiber lengths passing through and engaged with a rigid wall member or tubesheet having first and second generally parallel faces, all of said lengths having open ends protruding from said first face and at least a majority of said lengths having closed-ended portions extending from said second face, B. immersing said open fiber ends in a pool of a liquid sealant to a depth such that the distance between said first face and the surface of said pool external to the fiber ends is d, the force of capillary attraction between the walls of said fibers and said sealant being such that said sealant is drawn into said defective fibers for a distance greater than d, thereby filling them to a level beyond said face, the resistance to compression of the gases within the closed ended lengths being such that said capillary attraction does not suffice to draw the sealant into said closed ended lengths beyond a point substantially below said level, C. removing the unimbibed sealant from contact with said protruding fiber ends, the imbibed sealant being so composed as to be convertible, in-situ and at a temperature below the distortion temperature of said lengths, to plugs of a solid, non-porous material sealingly bonded to the fiber walls and having a coefficient of expansion substantially matching that of the fiber material, D. converting the imbibed sealant to said plugs and E. severing the protruding fiber ends from said tubesheet, with the result that the defective fibers in the treated assembly are plugged and the good fibers are not plugged.

Of particular value is the embodiment of the invention, as above defined, wherein said closed ended lengths are adapted to function as the electrolyte/separator in a high temperature battery cell, said sealant is a suspension, in an inert, volatilizable liquid, of glass or ceramic particles which have a maximum diameter of about ⅛ or less of the inner diameter of said fiber lengths and will fuse together to form said plugs when heated to a temperature $T_1$, which is less than the distortion temperature of said lengths, and said assembly is heated to $T_1$, thereby devolatilizing said suspension in said defective fibers and converting said particles therein to said plugs.

In a preferred mode of practising the invention, as above defined, a sealant is employed which exerts a vapor pressure of at least 12 mm of Hg at about 20° C., thereby ensuring that the total gas pressure in the fibers will suffice to effectively reduce the distance the sealant will be drawn by capillary attraction into the good, i.e., closed ended, fibers. The extent, if any, to which the tubesheet must be ground to ensure that the unbroken fibers will not be plugged is accordingly reduced.

Definitions

Certain of the terms used in the foregoing summary require definition and, accordingly, are defined as follows:

The term "defective" fibers is intended to refer to fiber lengths, the open ends of which protruding from the outer tubesheet face communicate with openings in the same lengths on the opposite side of the tubesheet, i.e., to fibers which are broken off or have incomplete walls or end closures.

The term "rigid" is intended to apply not only to fully cured or densified, non-porous tubesheets but also to green or partly cured (or sintered) tubesheet structures which may be porous and not fully densified but are self-supporting and retain their shape under the conditions of fabrication employed.

The terms "closed ended portions" and "closed ended lengths" are intended to apply not only to unlooped fibers having only one open end but also to fiber loops having two open ends, both of which protrude from the outer tubesheet face.

The term "severing" includes removal of the protruding "open" fiber ends and/or the portions of said ends initially within the tubesheet but immediately adjacent to said first face, by grinding.

The phrase "substantially below said level" refers to a distance such that the portion of the tubesheet immediately adjacent the face can be removed (as by grinding), to reopen the closed ended lengths, without effectively unplugging the defective lengths or rendering the remaining tubesheet structure too thin to serve its intended purpose.

The meaning of the term "substantially matching" is made evident by the subsequent discussion herein of how the difference in coefficients of expansion (for the sealant and fiber materials) which can be tolerated depends on the flexibilities of those materials and on the temperature at which the treated assembly is designed to operate.

DETAILED DESCRIPTION

Methods of constructing hollow fiber permeability separatory devices are now well known. Closed-end, unlooped fibers are generally not employed in such devices, since such purposes as may be so served can more efficiently be served by using fiber loops, i.e., fibers bent in an elongated U-shape and having both ends terminating at and opening upon the same surface of a given tubesheet. However, if it is elected to use unlooped fibers having one end closed, no fabrication techniques or apparatus arrangements not already familiar to those skilled in the art are required.

To date, fiber loops have not been proposed to be used in high temperature batteries. However, hollow fibers suitable for such use are not so stiff that they cannot be bent in a radius of the dimensions appropriate to present cell designs. The use of unlooped, closed-end, hollow fibers is presently preferred but is not considered essential to the fabrication of volume-efficient, high temperature battery cells in which the fibers will function as the electrolyte separator.

For an exemplary description of a method of assembling hollow fiber battery cells, reference may be had to the aforementioned U.S. Pat. No. 3,791,868 and to U.S. Pat. No. 3,917,490 (Example 4; column 9). (The entire disclosures of the patents cited herein are incorporated herein by reference.)

A typical, high temperature battery cell to which the present invention relates is an alkali-metal/sulfur cell in which the electrolyte takes the form of a large number of closely spaced, alkali-metal cation conductive, un-looped hairlike glass or ceramic tubules. A generally cylindrical cup or container for the catholyte ($Na_xS_y$, for example) and an inverted, generally cylindrical cup for the anolyte ($Na°$, for example) are abutted against and joined in sealing arrangement to the peripheral portion of an intervening, horizontal, impervious, electrically non-conducting tubesheet/separator disc. The tubules or hollow fiber lengths have their lower ends closed and their upper ends open and pass through the tubesheet in sealing engagement therewith. The open ends of the fibers communicate with the molten alkali metal in the anolyte reservoir above the tubesheet and the portions of the fibers dependent from the tubesheet are immersed in the underlying molten catholyte. Wraps of a perforated, carbon-coated aluminum foil are interleaved between the (generally concentric) fiber rows and serve to collect and convey the cathode current to (or from) an external, electrical cathode connection. An anodic electrode is immersed in the molten metal, which also functions as a current collector, and extends through the anolyte container, in sealing engagement with the same, to provide an external, electrical anode connection.

Tubesheet-fiber assemblies of the type employed in the above-described cell can be made as follows. A plurality of the hollow electrolyte fibers are closely spaced upon an elongated generally rectangular sheet of electrically and thermally conductive material, such as a foil. The sheet has first and second elongated edges. The fibers are positioned generally parallel to one another and transversely to the elongated axis of the sheet. In positioning the fibers, the open ended portions are allowed to extent to a uniform degree beyond the first elongated edge of the sheet thereby to provide a margin. The opposite or closed ends of the fibers may be allowed to uniformly approach the second elongated edge of the sheet with the sheet extending beyond the closed ends of the fibers to form a skirt. A very small amount of a readily decomposed or catholyte-compatible adhesive may be used to maintain the fibers in their respective places after they have been positioned.

Once the fibers are positioned, the fibers, foil and skirt can be rolled up. While this is being done, a band of a potting compound (of a solid or paste-like consistency) is applied to the fibers between the open ends thereof and the first elongated edge of the sheet, i.e., the potting compound is applied along the open-ended portions of the fibers forming the margin, just ahead of the nip of the forming roll. (When the completed assembly is to be processed by the method of the present invention, to ensure that any defective fibers are plugged, the width of the band of potting compound preferably is less than the width of the margin. That is, care is taken to be sure that unpotted terminal portions of the open fiber ends will protrude from the tubesheet, once it is formed by rolling up the assembly.)

A strip of the same conductive material which is equal to or greater in thickness than a fiber diameter is positioned adjacent to the second elongated edge of the sheet to function as a conductive spacing tape having about the same width as the skirt.

The sheet, fibers, spacing tape and potting material are then rolled up, preferably about a mandrel or core. The core may be electrically conductive, in which case a lower protruding end thereof can serve as a cathode terminal; or, it may be non-conducting. It can be left in the final "jelly roll" or removed.

As the roll is wound up, the band of potting compound forms a continuous layer adjacent to the open ends of the fibers. The continuity of the layer of potting compound is ensured by applying the band in a thickness corresponding to the thickness of the spacer tape. The final step in forming the potting compound into a fluid-impermeable tubesheet in sealing engagement with all the fibers is to cause a change to occur within the potting compound to produce a uni-bodied structure. This can be accomplished, for example, by chemically and/or thermally "curing" the compound. AS it is generally desirable to encase the tubesheet fiber assembly in one or more container or reservoir members which are in sealing engagement with the tubesheet, it may be desirable to postpone final setting of the potting material until the container members have been contacted with it. If the materials forming the container members and potting compound have been properly selected, the potting compound will form a sealing engagement with the container members during the setting process. Optionally, an adhesive can be used to bind the container members to the tubesheet after it has been formed.

At some stage of assembly while the bottom of the rolled-up assembly is still accessible, one or more weld beads are formed thereon by fusing successive sheet and spacer-tape edge portions together with a helium-shielded electric arc.

Although other assembly methods are considered feasible, they are not considered very practical. However, the practice of the invention is not limited to tubesheet-fiber assemblies made by any particular method. Also, it will be recognized that the presence of an electrically conductive material, such as a foil, between the rows of fibers in the assembly, is not essential to the practice of the present invention. Other means of spacing the fiber rows from each other in the assembly will be apparent to those skilled in the art. Similarly, other electrically conductive means, such as micro-fibers of graphite mixed with the catholyte, may be introduced between the electrolyte fibers after the tubesheet-fiber assembly is formed. In another option, an uncoated, porous sheet (gauze or perforated foil) formed from a conductive, non-corroding metal, such as molybdenum, for example, may be employed as the cathodic current collector.

Once the tubesheet has been "cured", at least to such an extent that it becomes "rigid", the tubesheet-fiber assembly can be treated by the method of the invention to remedy leaks or to ensure the absence of same. If the assembly does not include foil wraps and/or a protruding mandrel end, extreme care must be taken in handling it to ensure that no unplugged fibers are broken after the plugging operation. This can be done by touching only the tubesheet edge during such manipulations as are necessary before the dependent portion of the fiber bundle is emplaced in and protected by the catholyte reservoir. However, the probability of damage is minimized and handling facilitated if the assembly does include the foil wraps, particularly when the assembly was formed about a mandrel which protrudes from the lower end of the assembly. Accordingly, assemblies of the latter type are highly preferred for the practice of the invention in preparing high temperature battery cells.

It should be noted that fibers of the types known to be suitable for use in high temperature battery cells are generally deleteriously effected by moisture and should be kept in low humidity environments. Such cells should be fabricated in "glove boxes" or "dry rooms".

The coefficients of expansion of the sealant and fiber materials should substantially match. The extent of mismatch between the coefficients of expansion of the cured sealant (plug) and the fiber materials which can be tolerated in a given assembly depends on the flexibilities of the different materials and on the absolute difference ($\Delta t$, °C.) between the temperature at which the plugs are formed and the temperature furthest removed therefrom which the cell is likely to attain thereafter.

To avoid imposition of high thermal stresses, the difference between the coefficients of expansion ($\Delta x$) should be such that the product $\Delta x \cdot \Delta T \cdot E$ is not greater than 3 kilograms per square millimeter, where E is the Youngs modulus of elasticity (kg/mm$^2$) for whichever material the sealant or the fibers has the lowest modulus.

For tubesheet/fiber assemblies to be used in high temperature batteries as described earlier herein, the maximum value $\Delta T$ will usually be the difference between ordinary ambient temperatures (say 25° C.) and the temperature (say about 400° C.) at which the sealant first becomes solid after being sintered.

At this $\Delta T$ ($\sim 375°$), assuming a modulus of 7000 kg/mm$^2$ for the sealant, the value of $\Delta x$ must be less than $1.143 \times 10^{-6}$ units/°C. if $\Delta x \cdot \Delta T \cdot E$ is not to exceed 3 kg/mm$^2$.

The general leak-plugging procedure is carried out, as follows, at some point in the overall cell fabrication sequence after rigidification of the tubesheet and before removing the fiber ends protruding from it. The assembly is positioned with respect to a suitably confined pool of the liquid sealant composition, preferably by inverting the assembly and dipping the open fiber ends in the pool, in such manner that the protruding fiber ends extend, for at least part of their lengths, into the sealant. The distance (d) between the surface of the tubesheet and the sealant pool should be short enough so that the capillary attraction between the sealant composition and the fiber walls will draw the sealant into the defective (broken or imperfect) fiber lengths to a level at least beyond the face of the tubesheet nearest to the sealant pool.

That is, d must be less than h centimeters, the capillary rise, as defined by the relationship $$h = 4\gamma \cos\theta / D\rho g$$

wherein $\gamma$ is the surface tension of the sealant (in dynes/cm), $\theta$ is the liquid-solid wetting angle (in degrees), D is the inner diameter of the fiber (in cm), $\rho$ is the fluid density of the sealant (in grams/cc) and g is the gravitational constant (980 cm/sec$^2$).

It is apparent that h, the rise of the sealant in defective fibers of a given diameter can be increased by using a sealant composition which has a higher surface tension and/or a lower density. Or conversely, h may be made smaller by composing the sealant to have a lower surface tension and/or higher density. In any case, d must be small enough and h large enough to ensure that plugs will be present in the portions of the defective fiber lengths remaining in the assembly after the treatment of the present invention is finished, regardless of whether or not that treatment includes grinding the tubesheet.

In order to ensure that the sealant will not rise too far in the closed-ended fiber lengths, the resistance to compression of the gases within those lengths must have a certain minimum value. This value can readily be calculated by those skilled in the art. For example, for fibers having an inner diameter of 50 microns, such calculations show that the total gas pressure in the closed ended lengths, expressed in millimeters of mercury should exceed $0.6\gamma$. Since most organic liquids have surface tensions between 20 and 30 dynes per centimeter, sealants comprising such solvents will usually have vapor pressures of from 12 to 18 mm Hg at ordinary ambient temperatures. (Toluene, for example, has a vapor pressure of 20 mm Hg at 18° C.) Thus, the total gas pressure in closed ended fibers immersed in such solvents will generally be at least 12 mm Hg.

The open fiber ends are allowed to remain in the pool until the sealant has been drawn far enough into any defective fibers so that they will remain plugged after the protruding open ends are severed. The assembly is then removed from contact with the sealant pool and the excess sealant adhering to the exterior surfaces of the fiber ends (and any which may adhere to the tubesheet) is washed off, as with some of the liquid medium employed in the sealant composition. The imbibed sealant is solidified to non-porous, solid plugs, as by removing any volatiles and "curing" or "setting" the non-volatile constituents thereof. The latter operation may be carried out by such means as sintering or by inducing chemical linking reactions (as by use of catalysts, simple heating or electromagnetic irradiation).

The protruding fiber ends may be severed before the imbibed sealant is solidified but ordinarily it is preferable to effect plug formation first, for reasons which will be apparent.

The tubesheet may initially be thick enough so that the face from which the open fiber ends protrude can be ground down, to give the finished tubesheet a smooth working surface. In this event, it is not necessary to keep the sealant from moving into the closed ended fibers as far as the latter face. It is only necessary to keep it from advancing so far that the tubesheet will have to be ground excessively to reopen the good fibers. (In any case, the use of the sealant in the good fibers can be controlled by manipulating the vapor pressure of the sealant, as discussed above.)

In a preferred mode of operation the plugs in the defective fiber lengths are composed of the same relative amounts of the same ingredients as the tubesheet itself, thus assuring an even match in expansion coefficients and permitting plug formation and final tubesheet "curing" (densification) to be carried out in a single operation, such as sintering. In this mode, the sealant conveniently (and preferably) is a solution (or slurry) of the tube-sheet material (or particles thereof) in a readily volatilized, or controllably reactive, and otherwise suitable liquid medium.

Any undissolved particles present in the sealant composition should have maximum diameters which are about ⅛ or less of the inner diameters of the fiber portions to be plugged. Otherwise, bridging of the particles may occur, thus preventing the sealant from flowing far enough into the defective fibers. Preferably, the particle diameter is not greater than 1/5 of the fiber diameter.

In a typical application of the present method to high temperature batteries, tubesheet glass fines having maximum diameters of about 10 microns or less will be found suitable for plugging defective fibers having an inner diameter within the range of from about 30 to about 80 microns.

Although not indispensable, volatilizeable or nondetrimental suspending agents preferably are included in sealants comprising glass or ceramic particles. For example, aliphatic primary amines of from about 12 to about 42 carbons have been found particularly suitable for this purpose in preparing slurries (in aromatic solvents) of finely ground sodium borate glasses.

The method of the invention is most conveniently carried out in ordinary environments but may be practiced under such conditions as are feasible to establish and maintain in dry boxes ("glove boxes"), dry rooms and the like.

Practice of the invention with tubesheet/hollow fiber assemblies suitable for use in high temperature batteries is illustrated by (but not limited to) the following procedure.

Hollow glass fibers having an inner diameter of about 50 microns and an outer diameter of about 70 microns are prepared from a molten glass having the composition $Na_2O \cdot 2B_2O_3 \cdot 0.16NaCl \cdot 0.2$ $SiO_2$, in the manner described in a U.S. Patent Application, Ser. No. 729,440, entitled FERRULE AND USE THEREOF FOR COOLING A MELT SPUN HOLLOW FIBER AS IT EMERGES FROM A SPINNERETTE, and filed Oct. 4, 1976 and now issued as U.S. Pat. No. 4,050,915.

Fragments of a solder glass (94% $B_2O_3$, 6% $Na_2O$) are converted to a fine powder (particle size less than 10 microns) by grinding them in the manner disclosed in U.S. Pat. No. 3,917,490. An extrudable tubesheet composition is made by mixing 2 parts by weight of the fines and 2 parts of −250 mesh (U.S. Std) spheres of the same solder glass with about 0.4 parts of cumene.

A hollow fiber and tubesheet assembly adapted for use in a high temperature battery is assembled, essentially in the manner described earlier herein, from lengths of the preceding fibers, open at one end and closed at the other. The assembly includes a carbon-coated, perforated aluminum foil strip, a spacer skirt of the same foil and a central mandrel (aluminum rod). The tubesheet is formed by extruding the preceding composition on the open-ended portions of the fibers extending beyond the foil edge, as the assembly is rolled up, and heating the resulting disc or wall member with an infrared lamp until it is dry (essentially cumene-free) and self-supporting (rigidified). The open ends of the fiber lengths protrude about 1 cm from the outer (upper) face of the tubesheet and the closed ends extend about 10 cm from the inner (lower) face.

A sealant slurry is prepared by mixing the preceding solder glass powder with a 5 wt. % solution of dodecyl amine in toluene, in a ratio of 0.5 cc of the solution per gram of fines.

The assembly is inverted and the protruding open fiber ends immersed in the slurry to a depth of about 0.5 cm (d=1.0−0.5=0.5 cm) for about 2 minutes. It is then lifted out of contact with the sealant slurry and washed by dipping the protruding fiber ends in toluene.

Heat is then applied to the assembly, with an infrared lamp, until the rate of toluene vaporization from the assembly is negligible. (This usually requires from 1 to several hours.)

Next the non-volatile residuum of the sealant (in the "open" fiber ends) and the tubesheet are rendered nonporous and bonded to the fibers by staged heating of the assembly. The assembly is first heated in vacuo to a temperature of up to about 385° C. and maintained at that temperature until essentially no further densification occurs. It is then heated to about 405°, under $N_2$ at 1 atmosphere of pressure for about 1.5 hour. (The distortion temperature of the fibers is about 440° C.).

Finally, the protruding fiber ends are cut off flush with the tubesheet face. The face may be ground smooth but this is not necessary to ensure that the unbroken fibers are unplugged in this case. That is, the sealant has risen in the defective fiber lengths about 2 cm, but has risen less than a millimeter in the closed ended lengths.

Optionally, the preceding densification can be carried only far enough (by using a lower temperature and/or reducing the residence time) so that the bond between the fibers and the solder glass will not be disturbed by removing the fiber ends. The fiber ends can then be removed and the final sintering carried out with the tubesheet periphery in contact with the anode and cathode cups, so that a unitary cell (sans anolyte and catholyte) is formed.

The sintering operation optionally may be carried out in a single heating stage (if the fiber ends are not removed until after sintering is complete).

EXAMPLE

The foregoing procedure (including two-stage sintering) was employed to prepare an assembly comprising a bundle of about a thousand fiber lengths, of which at least twelve had had their closed ends deliberately broken off. An otherwise essentially identical assembly, known to contain only a few broken fibers, was prepared without being treated according to the present invention. Both assemblies were incorporated in identical cells (sans anolyte and catholyte) and tested for leaks by means of a leak rate detector having two glass chambers, an inlet chamber and a test chamber, each of about 5.0 ml volume. The chambers are connected to each other by means of a bubbler tube immersed about 2 mm in kerosene and by a pressure equalizing stopcock which bypasses the bubbler. With the bypass stopcock open, the assembly to be tested is connected to the test chamber and both chambers and the test assembly are pressured to 5 pounds per square inch with nitrogen gas. The gas supply is then shut off and the bypass stopcock closed. Leaks from the assembly being tested lower the pressure in the test chamber and gas flows through the bubbler from the inlet chamber to maintain a balance. The gas flow rate between chambers, which is equal to the leak rate of the test assembly, is determined by counting the bubbles per unit of time.

The untreated assembly leaked at a rate of about 0.1 cc (at standard conditions) of nitrogen per second, whereas the treated assembly exhibited a rate of less than 0.001 cc of $N_2$ per second (due to imperfect densification of the tubesheet itself; less than the leak rate calculable for one broken fiber).

It should be noted that the method of the present invention has the additional advantage of being effective to also close any cracks in the tubesheet itself (or along the area of contact between the tubesheet and one or more fiber walls) which extend clear through the tubesheet from one face to the other.

It should also be noted that the method of the invention is not limited in application to tubesheet/fiber assemblies in which the fibers are generally parallel to each other and generally perpendicular to the tubesheet faces.

We claim:

1. The method of treating a tubesheet/hollow fiber assembly to ensure that any defective fibers included therein will be selectively plugged, said method comprising
   A. providing as said assembly one which comprises a bundle of hollow fiber lengths passing through and engaged with a rigid wall member or tubesheet having first and second generally parallel faces, all of said lengths having open ends protruding from said first face and at least a majority of said lengths having closed-ended portions extending from said second face,
   B. immersing said open fiber ends in a pool of a liquid sealant to a depth such that the distance between said first face and the surface of said pool external to the fiber ends is d,
      the force of capillary attraction between the walls of said fibers and said sealant being such that said sealant is drawn into said defective fibers for a distance greater than d, thereby filling them to a level beyond said face,
      the resistance to compression of the vapors within the closed ended lengths being such that said capillary attraction does not suffice to draw the sealant into said closed ended lengths beyond a point substantially below said level,
   C. removing the unimbibed sealant from contact with said protruding fiber ends,
      the imbibed sealant being so composed as to be convertible, in-situ and at a temperature below the distortion temperature of said lengths, to plugs of a solid, non-porous material sealingly bonded to the fiber walls and having a coefficient of expansion substantially matching that of the fiber material,
   D. converting the imbibed sealant to said plugs and
   E. severing the protruding fiber ends from said tubesheet,
with the result that the defective fibers in the treated assembly are plugged and the good fibers are not plugged.

2. The method of claim 1 wherein said sealant exerts a vapor pressure of at least 12 mm Hg at a temperature of about 20° C.

3. The method of claim 1 wherein the imbibed sealant is converted to said plugs before the protruding ends are severed.

4. The method of claim 1 wherein said closed ended lengths are unlooped.

5. The method of claim 1 wherein:
   said closed ended lengths are adapted to function as the electrolyte/separator in a high temperature battery cell,
   said sealant is a suspension, in an inert, volatilizable liquid, of glass or ceramic particles which have a maximum diameter of about ⅛ or less of the inner diameter of said fiber lengths and will fuse together to form said plugs when heated to a temperature $T_1$, which is less than the distortion temperature of said lengths, and
   said assembly is heated to $T_1$, thereby devolatilizing said suspension in said defective fibers and converting said particles therein to said plugs.

6. The method of claim 5 wherein said tubesheet is initially porous, remains porous after being heated to $T_1$ and is rendered non-porous by further heating said assembly to a temperature $T_2$ which is greater than $T_1$ but is also less than said distortion temperature.

7. The method of claim 5 wherein said fiber lengths have an inner diameter within the range of from about 30 to about 80 microns and said particles have maximum diameters of about 10 microns or less.

8. The method of claim 5 wherein said tubesheet is initially porous but is rendered non-porous by said heating of said assembly to temperature $T_1$.

9. The method of claim 8 wherein said tubesheet and said particles are composed of the same relative amounts of the same ingredients.

10. The method of claim 5 wherein said assembly additionally comprises a perforated metallic sheet disposed therein as a plurality of generally concentric layers spiralled about the central axis of said bundle and separated by intervening, generally concentric layers of said closed ended fiber portions.

11. The method of claim 10 wherein said tubesheet has essentially the same composition as said particles, is initially porous and is rendered non-porous by said heating to temperature $T_1$.

12. A tubesheet and hollow fiber assembly produced by the method of claim 2.

13. An assembly as defined in claim 12 in which said tubesheet has essentially the same composition as said particles, is initially porous and is rendered non-porous by said heating to temperature $T_1$.

* * * * *